E. A. OSBORNE & A. A. GASTON.
Coolers for Milk and Butter.
No. 151,046. Patented May 19, 1874.
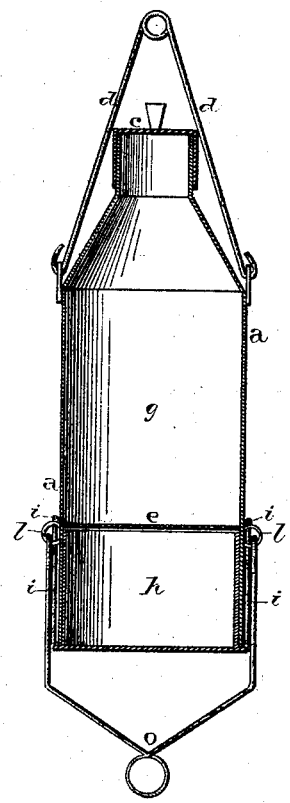
WITNESSES.
W. W. J. Murphy
J. Wm. Gorner
INVENTORS.
E. A. Osborne
A. A. Gaston
per
F. A. Lehmann, Atty
AM. PHOTO-LITHOGRAPHIC Co. N.Y. (OSBORNE'S PROCESS.)

UNITED STATES PATENT OFFICE.

EDWIN A. OSBORNE AND ALBERT A. GASTON, OF CHARLOTTE, N. C.

IMPROVEMENT IN COOLERS FOR MILK AND BUTTER.

Specification forming part of Letters Patent No. 151,046, dated May 19, 1874; application filed May 4, 1874.

*To all whom it may concern:*

Be it known that we, EDWIN A. OSBORNE and ALBERT A. GASTON, of Charlotte, in the county of Mecklenburg and State of North Carolina, have invented certain new and useful Improvements in Milk and Butter Coolers; and we do hereby declare the following to be a full, clear, and exact description of the invention, such as will enable others skilled in the art to which it pertains to make and use it, reference being had to the accompanying drawings, which form part of this specification.

The nature of our invention relates to an improvement in milk and butter coolers; and it consists in dividing the can into two compartments, in the upper one of which the milk is placed, and in the lower one the butter; the can being designed to be lowered down into the well, and kept wholly or partly immersed in the water by means of a weight attached to the lower end of the can, as will be more fully described hereafter.

The accompanying drawing represents our invention.

$a$ represents a can, of the usual shape and construction for holding milk, and which is provided with a water-tight cover, $c$, and a bail, $d$. About one-third of the length of the can from its bottom is placed the partition $e$, which divides the can in two, and forms the chamber $g$, in which the milk is kept. Into the bottom of the can is inserted, water-tight, the cup-shaped vessel $h$, which reaches up to the partition $e$, and forms a receptacle for the butter; the said vessel being retained in the bottom of the can by means of the clasps or other devices $i$, which catch over the projections or rings $l$, secured to the sides of the can $a$. In order to cause the can to wholly or partially sink in the water a weight is attached to the hanging detachable bail $o$, the bail serving not only to sustain the weight, but to lock the clasps over the rings, so that the vessel $h$ cannot possibly become loose and drop out.

The milk and butter having been placed in their respective places, the whole can is lowered down into the cistern or well by means of a rope attached to the bail $d$, where they are kept cool and fresh.

Having thus described our invention, we claim—

1. A cooler consisting of the can $a$, divided by the partition $e$, in combination with the vessel $h$, provided with the clasps or holding devices $i$ $l$, the two parts being arranged as shown.

2. In combination with the can $a$ and vessel $h$, the hanging bail $o$, for sustaining a weight and locking the clasps, substantially as set forth.

In testimony that we claim the foregoing, we have hereunto set our hands this 1st day of May, 1874.

ALBERT A. GASTON.
    EDWIN A. OSBORNE.

Witnesses:
    W. H. HOFFMAN,
    R. N. GRIMES.